United States Patent
McKenney (10) Patent No.: US 8,495,641 B2
(45) Date of Patent: *Jul. 23, 2013

(54) EFFICIENTLY BOOSTING PRIORITY OF READ-COPY UPDATE READERS WHILE RESOLVING RACES WITH EXITING AND UNLOCKING PROCESSES

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1553 days.

This patent is subject to a terminal disclaimer.

(21) Appl. No.: 11/771,570

(22) Filed: Jun. 29, 2007

(65) Prior Publication Data

US 2009/0006403 A1    Jan. 1, 2009

(51) Int. Cl.
  *G06F 9/46* (2006.01)
  *G06F 12/00* (2006.01)
  *G06F 13/00* (2006.01)
  *G06F 13/28* (2006.01)

(52) U.S. Cl.
  USPC ........... 718/103; 718/100; 718/102; 711/151; 711/154; 711/155; 711/158

(58) Field of Classification Search
  USPC .................. 718/100, 103; 711/147, 150, 151, 711/152
  See application file for complete search history.

(56) References Cited

U.S. PATENT DOCUMENTS

| | | | | |
|---|---|---|---|---|
| 5,442,758 A * | 8/1995 | Slingwine et al. | ............ | 717/147 |
| 5,608,893 A * | 3/1997 | Slingwine et al. | ............ | 711/141 |
| 5,727,209 A * | 3/1998 | Slingwine et al. | ............ | 718/102 |
| 6,219,690 B1 * | 4/2001 | Slingwine et al. | ............ | 718/102 |
| 6,411,983 B1 * | 6/2002 | Gallop | ............ | 718/104 |
| 6,874,144 B1 * | 3/2005 | Kush | ............ | 718/103 |
| 6,886,162 B1 * | 4/2005 | McKenney | ............ | 718/102 |
| 6,996,812 B2 | 2/2006 | McKenney | | |
| 7,111,298 B1 * | 9/2006 | Michael et al. | ............ | 718/104 |
| 7,392,421 B1 * | 6/2008 | Bloomstein et al. | ............ | 714/4.4 |
| 7,734,879 B2 * | 6/2010 | McKenney et al. | ............ | 711/151 |
| 2004/0216112 A1 * | 10/2004 | Accapadi et al. | ............ | 718/103 |
| 2005/0022186 A1 * | 1/2005 | Accapadi et al. | ............ | 718/100 |
| 2005/0050550 A1 * | 3/2005 | Fuller | ............ | 719/319 |
| 2005/0060710 A1 * | 3/2005 | Kush | ............ | 718/103 |

(Continued)

OTHER PUBLICATIONS

Hart et al, "Making Making Lockless Synchronization Fast: Performance Implications of Memory Reclamation", Jun. 2006, IEEE, pp. 1-10.*

(Continued)

*Primary Examiner* — Emerson Puente
*Assistant Examiner* — Charles Swift
(74) *Attorney, Agent, or Firm* — Walter W. Duft (57) ABSTRACT

A technique for efficiently boosting the priority of a preemptable data reader while resolving races between the priority boosting and the reader exiting a critical section or terminating in order to eliminate impediments to grace period processing that defers the destruction of one or more shared data elements that may be referenced by the reader until the reader is no longer capable of referencing the one or more data elements. A determination is made that the reader is in a read-side critical section and the reader is designated as a candidate for priority boosting. A verification is made that the reader has not exited its critical section or terminated, and the reader's priority is boosted to expedite its completion of the critical section. The reader's priority is decreased following its completion of the critical section.

20 Claims, 9 Drawing Sheets

U.S. PATENT DOCUMENTS

| | | | |
|---|---|---|---|
| 2005/0071577 A1* | 3/2005 | Dias et al. | 711/151 |
| 2005/0080824 A1* | 4/2005 | Vaidyanathan et al. | 707/201 |
| 2005/0125789 A1* | 6/2005 | Dijkstra et al. | 718/100 |
| 2005/0149634 A1 | 7/2005 | McKenney | |
| 2005/0198030 A1 | 9/2005 | McKenney | |
| 2006/0090104 A1 | 4/2006 | McKenney et al. | |
| 2006/0100996 A1* | 5/2006 | McKenney et al. | 707/3 |
| 2006/0112121 A1 | 5/2006 | McKenney et al. | |
| 2006/0117072 A1 | 6/2006 | McKenney | |
| 2006/0123100 A1 | 6/2006 | McKenney | |
| 2006/0130061 A1 | 6/2006 | McKenney | |
| 2006/0265373 A1* | 11/2006 | McKenney et al. | 707/8 |
| 2007/0083565 A1* | 4/2007 | McKenney | 707/200 |
| 2007/0101071 A1* | 5/2007 | McKenney | 711/152 |

OTHER PUBLICATIONS

McKenney, "Priority-Boosting RCU Read-Side Critical Sections", Apr. 16, 2007, IBM, pp. 1-16.*

J. Seigh, "RCU + SMR for preemptive kernel/user threads," Linux Kernel Mailing List, May 9, 2005, 2 pages.

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," LInux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

* cited by examiner

*FIG. 13* ly expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

EFFICIENTLY BOOSTING PRIORITY OF READ-COPY UPDATE READERS WHILE RESOLVING RACES WITH EXITING AND UNLOCKING PROCESSES

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a preemptive real-time computing environment. Still more particularly, the invention is directed to a technique for eliminating race conditions while boosting the priority of non-real-time processes holding references to shared data that could otherwise be freed.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
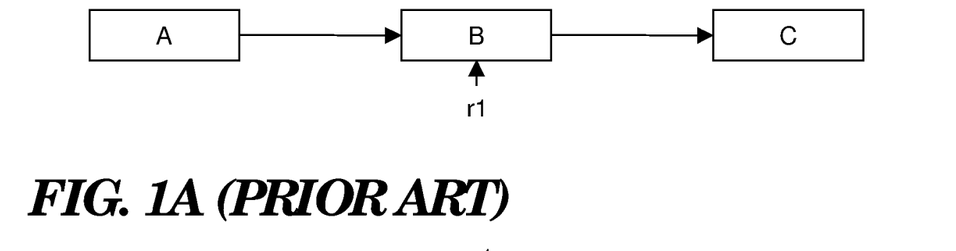
FIGS. 1A-1D are diagrammatic representations of a linked list of data elements undergoing a data element replacement according to a conventional read-copy update mechanism.
Figure 1B:
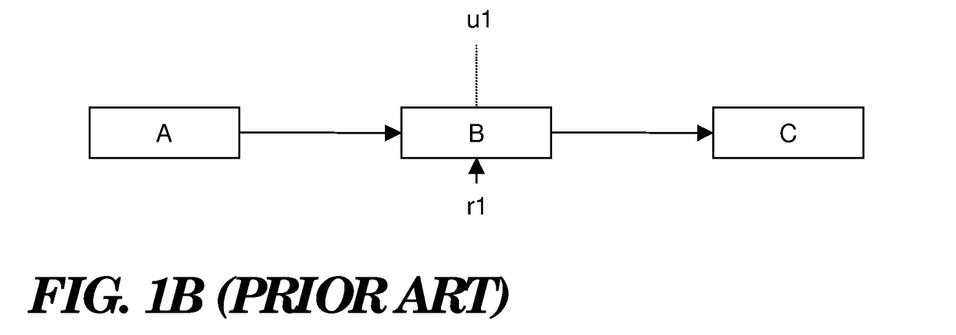
Figure 1C:
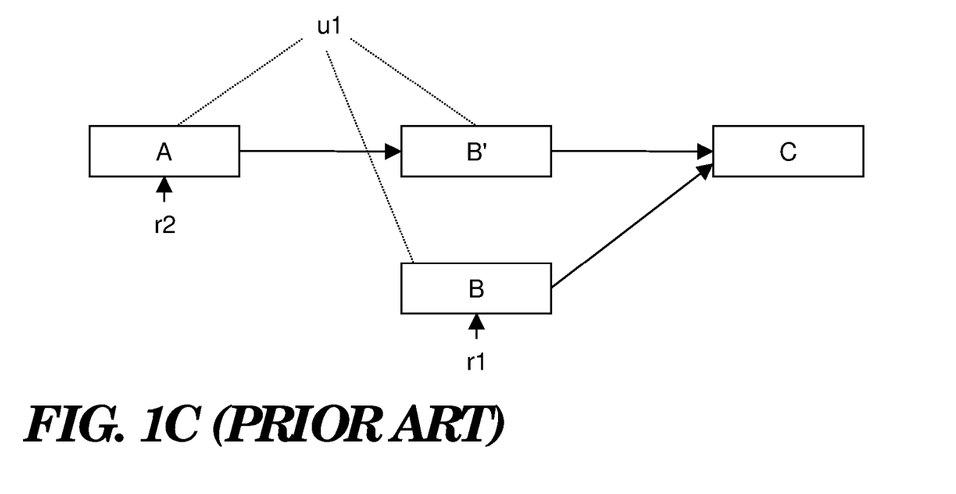

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization, transactional memory, or a designated update thread could be used to serialize data updates. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
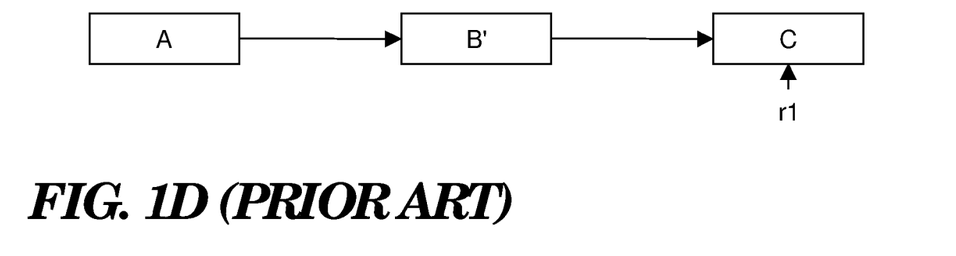

At some subsequent time following the update, r1 will have continued its traversal of the linked list and moved its reference off of B. In addition, there will be a time at which no other reader process is entitled to access B. It is at this point, representing expiration of the grace period referred to above, that u1 can three B, as shown in FIG. 1D.

Figure 2A:
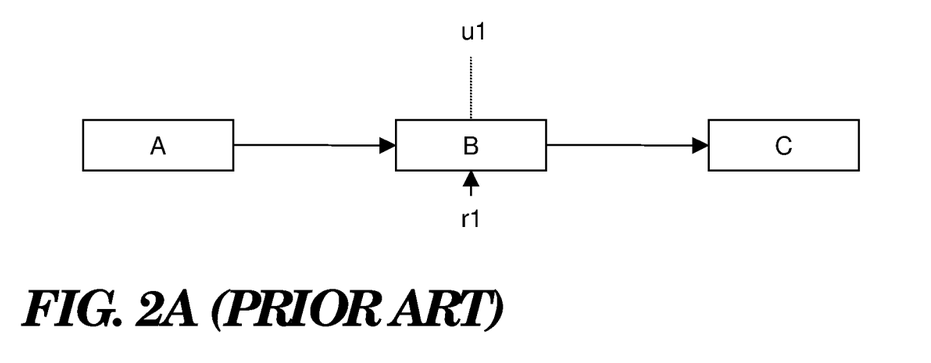
FIGS. 2A-2C are diagrammatic representations of a linked list of data elements undergoing a data element deletion according to a conventional read-copy update mechanism.
Figure 2B:
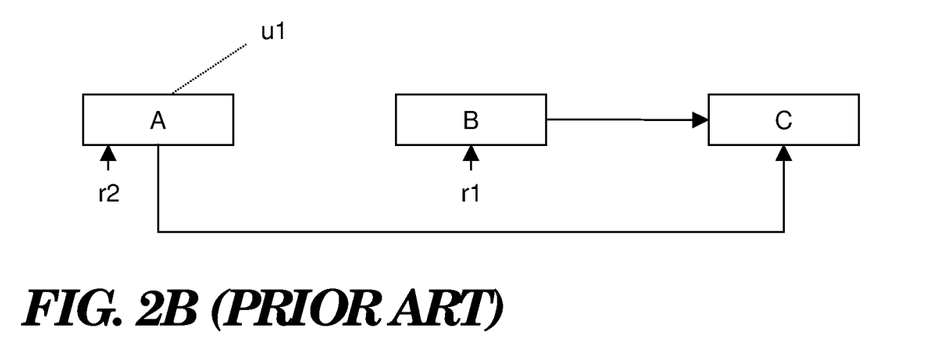
Figure 2C:
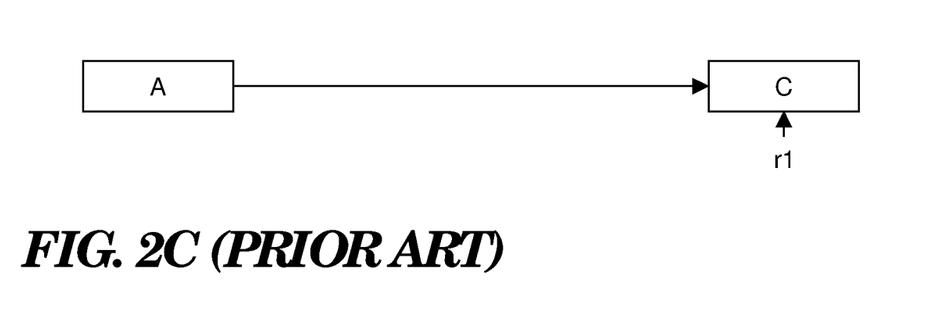

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

Figure 3:
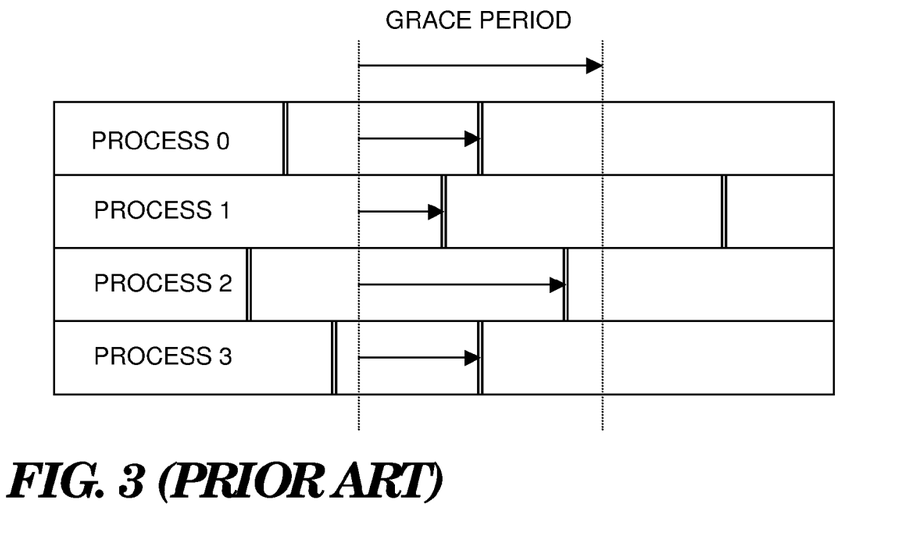
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring."

The callback processing technique contemplates that an updater of a shared data element will perform the initial (first phase) data update operation that creates the new view of the data being updated, and then specify a callback function for performing the deferred (second phase) data update operation that removes the old view of the data being updated. The updater will register the callback function (hereinafter referred to as a "callback") with a read-copy update subsystem so that it can be executed at the end of the grace period. The read-copy update subsystem keeps track of pending callbacks for each processor and monitors per-processor quiescent state activity in order to detect when each processor's current grace period has expired. As each grace period expires, all scheduled callbacks that are ripe for processing are executed.

Conventional grace period processing faces challenges in a preemptive realtime computing environment because a low priority reader holding a reference to shared data can be preempted by a higher priority process or blocked from acquiring a lock while in the read-side critical section. If the reader remains preempted or blocked for an extended period of time, grace periods cannot proceed and callbacks will not be processed. This can result in out-of-memory situations, which in turn can prevent high priority real-time processes from proceeding. Applicant's commonly assigned application Ser. No. 11/460,465 discloses a priority-boosting technique that overcomes the foregoing problem by efficiently boosting the priority of readers that are holding up current grace period processing, allowing such readers to be rescheduled so that they may complete their RCU read-side critical sections. However, an additional challenge that must be overcome is to eliminate races between readers that are undergoing priority boosting and the boosting task itself. Such races are a problem because priority boosting of a reader after it has exited its RCU read-side critical section is unwarranted and can result in the reader retaining its raised priority indefinitely, possibly causing realtime tasks to miss their realtime scheduling deadlines. In addition, if a reader has terminated at the point where an attempt is made to boost its priority, the priority boost attempt on the terminated task may produce unpredictable results. What is needed, therefore, is a solution that eliminates such races and avoids unwanted priority boosting of a reader after it has exited its critical section or has terminated altogether.

SUMMARY OF THE INVENTION

The foregoing problems are solved and an advance in the art is obtained by a method, system and computer program product for efficiently boosting the priority of a preemptable data reader while resolving races between the priority boosting and the reader exiting a critical section or terminating. This technique eliminates impediments to grace period processing that defers the destruction of one or more shared data elements that may be referenced by the reader until the reader is no longer capable of referencing the one or more data elements. Should the reader be subject to preemption or blocking, a determination is made whether the reader is in a read-side critical section. If it is, the reader is designated as a candidate for priority boosting. Before performing the actual priority boost, a verification is made that the reader has not exited its critical section or terminated. The reader's priority is then boosted to expedite its completion of the critical section. The reader's priority is decreased following its completion of the critical section.

According to exemplary embodiments disclosed herein, the designating operation may include changing a state of the reader from a first state that is indicative of the reader's priority not requiring boosting to a second state that is indicative of the readers priority requiring boosting. The priority boosting operation may then include changing the state of the reader from the second state to a third state that is indicative of the reader's priority having been boosted. The priority decreasing operation may then include changing the state of the reader from the third state to the first state. The designating operation may also include adding a reference to the reader on a first list of readers requiring priority boosting. The verification operation may then include determining whether the reference is still on the first list of readers. The priority boosting operation may then include moving the reference from the first list to a second list of readers whose priority has been boosted. The priority decreasing operation may then include removing the reference from whichever of the first list and the second list the reference is on. The first list and the second list may be protected by a lock or other mutual exclusion mechanism to serialize access thereto during the priority boosting and priority decreasing operations. The first list and the second list may represent a list pair that is an element of an array of similar list pairs each comprising a first list portion and a second list portion. The designating operation may then include acquiring a first list pair index to a list pair of the array that is to be used for adding reader references. The priority boosting operation may then include acquiring a second list pair index to a second list pair of the array that has been least recently used by the designating operation to add reader references. Additional options include one or more of the priority boosting operation boosting the reader's priority more aggressively under low memory conditions, the priority boosting operation successively boosting the reader's priority, and the priority boosting operation being implemented in multiple per-processor or per-multiprocessor node instances in a multi-processor or multi-mode environment.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 4:
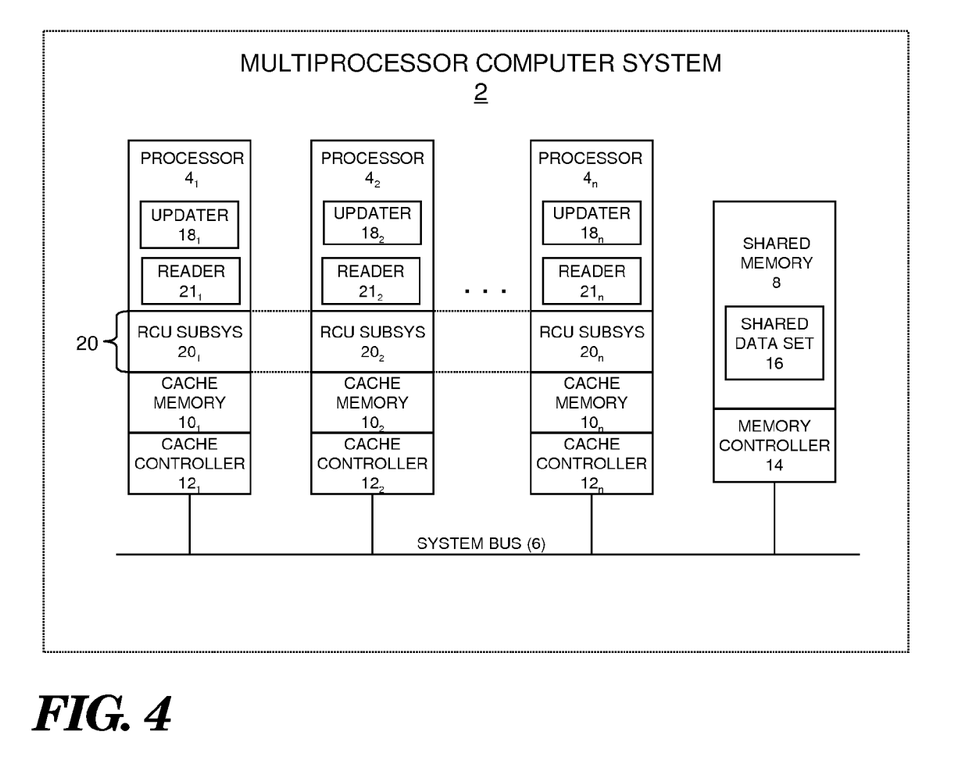
FIG. 4 is a functional block diagram showing a multiprocessor computing system that represents an exemplary environment in which the present invention can be implemented.

Turning now to the figures, wherein like reference numerals represent like elements in all of the several views, FIG. 4 illustrates an exemplary computing environment in which the present invention may be implemented. In particular, a symmetrical multiprocessor (SMP) computing system 2 is shown in which multiple processors $4_1, 4_2 \ldots 4_n$ are connected by way of a common system bus 6 to a shared memory 8. Respectively associated with each processor $4_1, 4_2 \ldots 4_n$, is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment. In the alternative, a single processor computing environment could be used to implement the invention, as could a hardware multithreading environment, a multi-core environment and a NUMA (Non-Uniform Memory Access) environment, to name but a few. Furthermore, multiple multitasking operating systems might all run concurrently on the same hardware under the control of a hypervisor, and some or all of these operating systems might implement read-copy update (RCU) synchronization, including the priority boosting technique described herein, as could the hypervisor itself.

It is further assumed that update operations executed within kernel or user mode processes, threads, or other execution contexts will periodically perform updates on a set of shared data 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$, are programmed to implement an RCU subsystem 20, as by periodically executing respective RCU instances $20_1, 20_2 \ldots 20_n$, as part of their operating system or user application functions. Each of the processors $4_1, 4_2 \ldots 4_n$ also periodically executes read operations (readers) $21_1, 21_2 \ldots 21_n$, on the shared data 16. Such read operations will typically be performed far more often than updates, insofar as this is one of the premises underlying the use of read-copy update.

Figure 5:
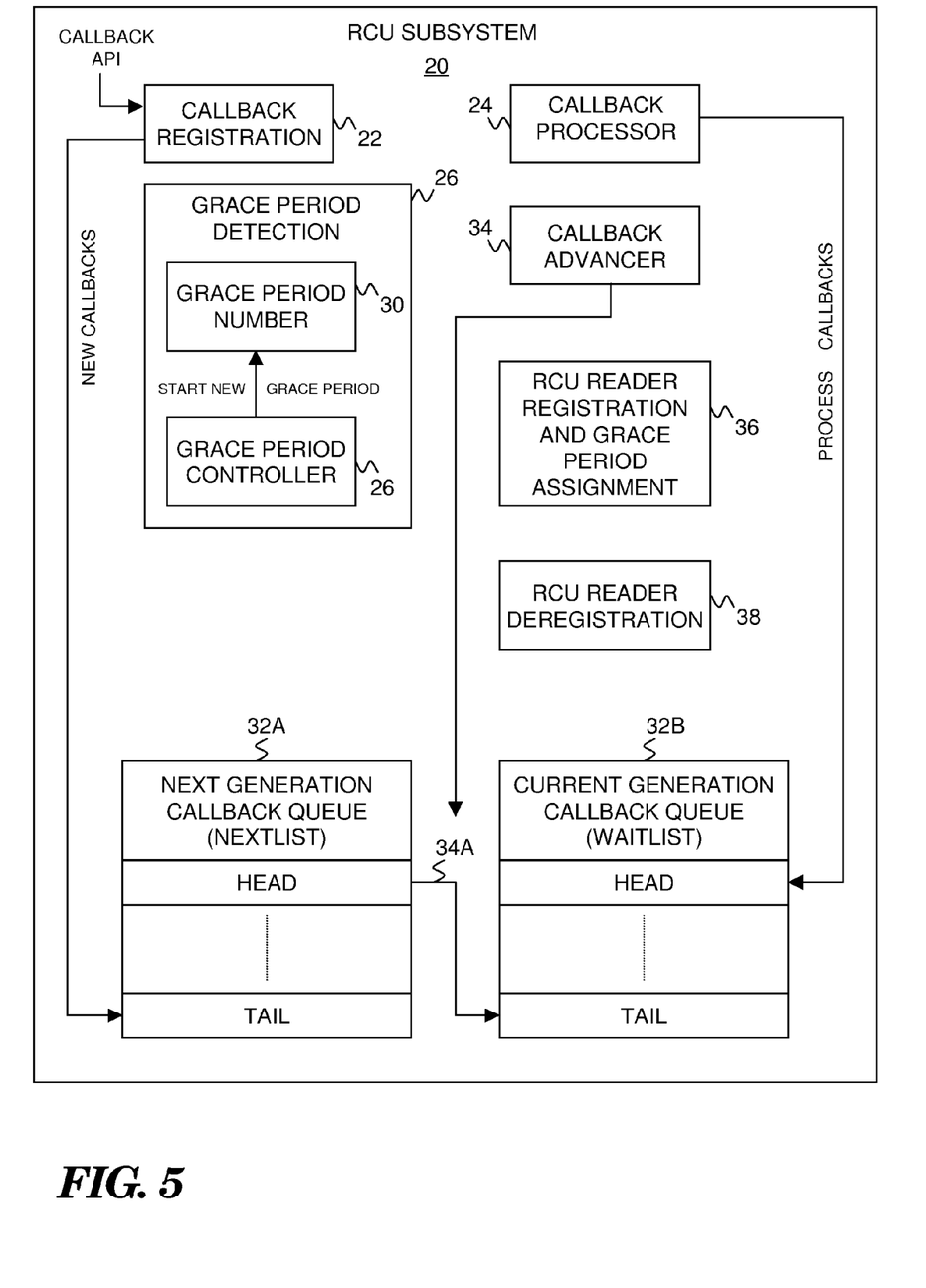
FIG. 5 is a functional block diagram showing a read-copy update subsystem that may be implemented by each processor in the multiprocessor computer system of FIG. 4.

As shown in FIG. 5, the RCU subsystem 20 may include a callback registration component 22. The callback registration component 22 serves as an API (Application Program Interface) to the RCU subsystem 20 that can be called by the updaters $18_2 \ldots 18_n$ to register requests for deferred (second phase) data element updates following initial (first phase) updates performed by the updaters themselves. As is known in the art, these deferred update requests involve the destruction of stale data elements, and may be handled as callbacks within the RCU subsystem 20. A callback processing component 24 within the RCU subsystem 20 may be used for executing the callbacks, then removing the callbacks as they are processed. A grace period detection component 26 determines when a grace period has expired so that the callback processor 24 can execute a new generation of callbacks. The grace period detection component 26 includes a grace period controller 28 that keeps track of the current grace period number 30 and determines when an old grace period has expired and a new grace period should start.

The read-copy update subsystem 20 may also implement a mechanism for batching callbacks for processing by the callback processor 24 at the end of each grace period. One exemplary batching technique is to maintain a set of callback queues 32A and 32B that are manipulated by a callback advancer 34. Although the callback queues 32A/32B can be implemented using a shared global array that tracks callbacks registered by each of the updaters $18_1, 18_2 \ldots 18_n$, improved scalability can be obtained if each read-copy update subsystem instance $20_1, 20_2 \ldots 20_n$ maintains its own pair of callback queues 32A/32B in a corresponding one of the cache memories $10_1, 10_2 \ldots 10_n$. Maintaining per-processor versions of the callback queues 32A/32B in the local caches $10_1, 10_2 \ldots 10_n$ reduces memory latency. Regardless of which implementation is used, the callback queue 32A, referred to as the "Next Generation" or "Nextlist" queue, can be appended (or prepended) with new callbacks by the callback registration component 22 as such callbacks are registered. The callbacks registered on the callback queue 32A will not become eligible for grace period processing until the end of the next grace period that follows the current grace period. The callback queue 32B, referred to as the "Current Generation" or "Waitlist" queue, maintains the callbacks that are eligible for processing at the end of the current grace period. As stated above, the callback processor 24 is responsible for executing the callbacks referenced on the callback queue set 32, and for removing the callbacks therefrom as they are processed. The callback advancer 34 is responsible for moving the callbacks on the Next Generation callback queue 32A to the end of the Current Generation callback queue 32B after a new grace period is started. The arrow labeled 34A in FIG. 5 illustrates this operation.

The reason why new callbacks are not eligible for processing and cannot be placed on the Current Generation callback queue 32B becomes apparent if it is recalled that a grace period represents a time frame in which all processors have passed through at least one quiescent state. If a callback has been pending since the beginning of a grace period, it is guaranteed that no processor will maintain a reference to the data element associated with the callback at the end of the grace period. On the other hand, if a callback was registered after the beginning of the current grace period, there is no guarantee that all processors potentially affected by this callback's update operation will have passed through a quiescent state.

In non-realtime computing environments, grace period detection can be conventionally based on each of the processors $4_1, 4_2 \ldots 4_n$ passing through a quiescent state that typically arises from a context switch. However, as described by way of background above, if the processors $4_1, 4_2 \ldots 4_n$ are programmed to run a preemptable realtime operating system, an executing process or thread (each of which may also be referred to as a "task"), such as any of the readers $21_1, 21_2 \ldots 21_n$, can be preempted by a higher priority task. Such preemption can occur even while the readers $21_1, 21_2 \ldots 21_n$ are in a kernel mode critical section referencing elements of the shared data set 16 (shared data elements). In order to prevent premature grace period detection and callback processing, a technique is needed whereby the readers $21_1, 21_2 \ldots 21_n$ can advise the RCU subsystem 20 that they are performing critical section processing.

Although one solution would be to suppress preemption across read-side critical sections, this approach can degrade realtime response latency. Another approach is to have readers "register" with the RCU subsystem 20 whenever they enter a critical section and "deregister" upon leaving the critical section. To that end, the RCU subsystem 20 is provided with two fast-path routines that the readers $21_1, 21_2 \ldots 21_n$ can invoke in order to register and deregister with the RCU subsystem prior to and following critical section read-side operations. In FIG. 5, reference numeral 36 represents an RCU reader registration component that may be implemented using code such as the Linux® Kernel rcu_read_lock( ) primitive. Reference numeral 38 represents an RCU reader deregistration component that may be implemented using code such as the Linux® Kernel rcu_read_unlock( ) primitive. The registration component 34 is called by a reader $21_1, 21_2 \ldots 21_n$ immediately prior to entering its read-side critical section. This code "registers" the reader $21_1, 21_2 \ldots 21_n$ for grace period processing by assigning the reader to either a "current" or "next" generation grace period and by setting a grace period indicator (e.g., a counter or a lock) that is not reset until the reader exits the critical section. The grace period indicators for each reader $21_1, 21_2 \ldots 21_n$ assigned to a particular grace period generation are periodically tested by the grace period controller 28 and a new grace period will not be started until the indicators associated with the previous grace period have been reset. The deregistration component 38 is called by a reader $21_1, 21_2 \ldots 21_n$ immediately after leaving its critical section. This code "deregisters" the reader $21_1, 21_2 \ldots 21_n$ from the RCU subsystem 20 by resetting the indicator set during invocation of the registration component 32, thereby signifying that the reader will not be impacted by removal of its critical section read data, and that a new grace period may be started.

Figure 6:
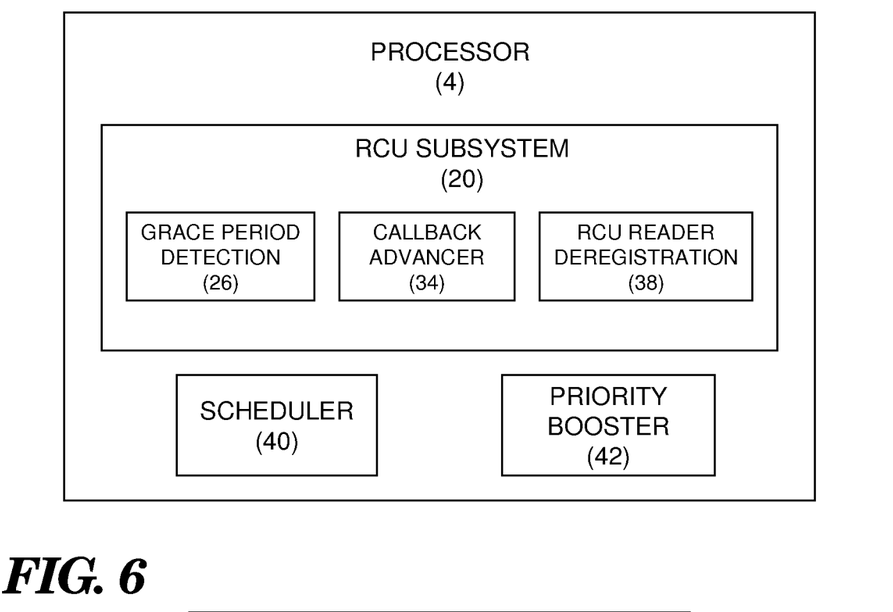
FIG. 6 is a functional block diagram showing components of a read-copy update subsystem together with a scheduler and a priority booster.

Various techniques may be used to implement the registration and deregistration components 36 and 38. For example, commonly assigned application Ser. No. 11/248,096 discloses a design in which RCU reader registration/deregistration is implemented using counters. In particular, when a reader registers for RCU read-side processing, it increments a counter that corresponds to a particular grace period generation. Grace period advancement and callback processing to remove the readers read-side data will not be performed until the reader deregisters and the assigned counter is decremented. Commonly assigned application Ser. No. 11/264,580 discloses an alternative design for implementing RCU reader registration/deregistration using reader/writer locks. In particular, when a reader registers for read-side processing, it acquires a reader/writer lock. Grace period advancement and callback processing to remove the reader's read-side data will not be performed until the reader deregisters and releases the reader/writer lock. In order to start a new grace period and process callbacks, the writer portion of each reader/writer lock must be acquired. Using either of the foregoing reader registration/deregistration techniques, preemption of a reader $21_1, 21_2 \ldots 21_n$ while in a read-side critical section will not result in premature callback processing because the RCU subsystem 20 must wait for each reader to deregister. However, as stated by way of background above, reader preemption or blocking while in a critical section following reader registration and prior to deregistration can cause produce undesirable out-of-memory (OOM) situations that prevent high priority real-time processes from proceeding. This problem can be solved by boosting reader priority using a technique as disclosed in commonly assigned application Ser. No. 11/460,465, wherein preempted or blocked readers are identified in an efficient manner without resort to techniques such as scanning an entire system process list or maintaining a list of processes currently residing in an RCU read-side critical section. In particular, in order for a reader $21_1, 21_2 \ldots 21_n$ to be eligible for a priority boost, it must be currently registered with the RCU subsystem 20 and running in an RCU read-side critical section. In addition, the reader $21_1, 21_2 \ldots 21_n$ must be subject to preemption or blocking (e.g., due to lock acquisition by another process) while in the read-side critical section. If the required circumstances are present, the priority of the reader $21_1, 21_2 \ldots 21_n$ becomes a candidate for boosting to an appropriate level. As shown in FIG. 6, a scheduler 40 running on one of the processors $4_1, 4_2 \ldots 4_n$ may be adapted to make the determination that a reader $21_1, 21_2 \ldots 21_n$ is currently registered with the RCU subsystem 20 and running in an RCU read-side critical section. The scheduler 40 also knows when the reader $21_1, 21_2 \ldots 21_n$ is subject to preemption or blocking. A priority boost task 42 (priority booster) may be run to perform the priority boost on the reader $21_1, 21_2 \ldots 21_n$. The RCU deregistration component 38 may be used to thereafter decrease the reader's priority when it completes its read-side critical section processing.

As stated by way of background above, an additional challenge that must be overcome when reader priority boosting is used during RCU read-side critical section processing is to eliminate races between readers $21_1, 21_2 \ldots 21_n$ that are undergoing priority boosting and the priority booster 42 itself. As mentioned, such races are a problem because priority boosting of a reader $21_1, 21_2 \ldots 21_n$ after it has exited its RCU read-side critical section is unwarranted and can result in the reader retaining its raised priority indefinitely, possibly causing realtime tasks to miss their realtime scheduling deadlines. In addition, if a reader $21_1, 21_2 \ldots 21_n$ has terminated at the point where an attempt is made to boost its priority, the priority boost attempt on the terminated task may produce unpredictable results.

Figure 7:
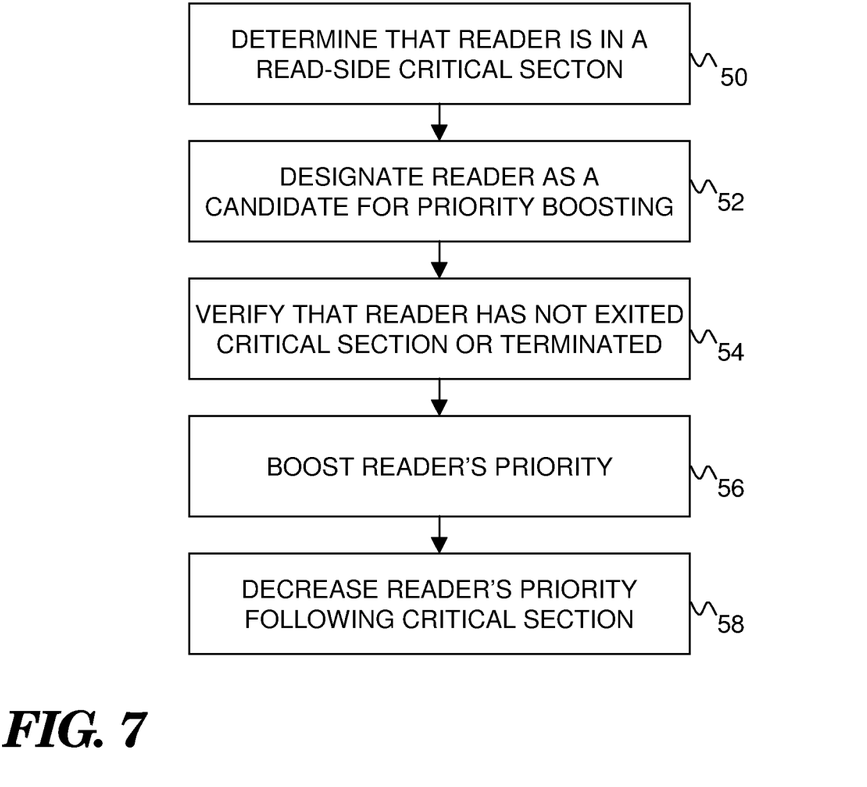
FIG. 7 is a flow diagram showing race-free priority boost processing that may be performed on behalf of a reader referencing a shared data element protected by read-copy update.

FIG. 7 illustrates exemplary operations that may be performed to avoid such races. In block 50, the scheduler 40 determines whether a reader $21_1, 21_2 \ldots 21_n$ that is subject to preemption or blocking is in an RCU read-side critical section. One way that this can be done is by checking a flag in the reader's task structure that is set by the RCU reader registration component 36 when the reader $21_1, 21_2 \ldots 21_n$ enters its critical section. In block 52, the scheduler 40 designates the reader $21_1, 21_2 \ldots 21_n$ as a candidate for priority boosting. As described in more detail below, this can be done by assigning the reader $21_1, 21_2 \ldots 21_n$ to a "ready-to-boost" state and placing it on a first list of readers that are in the same state. In block 54, the priority booster 42 verifies that the reader $21_1, 21_2 \ldots 21_n$ has not exited its RCU read-side critical section and then boosts the reader's priority in block 56. As also described in more detail below, the integrity of the verification operation may be assured by using a lock or other mutual exclusion mechanism on the first list of readers requiring a priority boost. By implementing the verification operation, races between a reader $21_1, 21_2 \ldots 21_n$ exiting its RCU read-side critical section and the priority booster 42 boosting the reader's priority will be eliminated. The priority booster 42 will only boost the priority of readers $21_1, 21_2 \ldots 21_n$ that are currently in the critical section and will not boost any reader that has completed critical section processing. As additionally described in more detail below, following priority boosting, the reader $21_1, 21_2 \ldots 21_n$ may be assigned to a "boosted" state and placed on a second list of readers that are in the same state. In block 58, the RCU deregistration component 38 decreases the reader's priority following the completion of RCU read-side critical section processing. As again described in more detail below, the reader $21_1, 21_2 \ldots 21_n$ may then be removed from whichever of the first or second list it is on, and it may be returned to an "idle" state.

Figure 8:
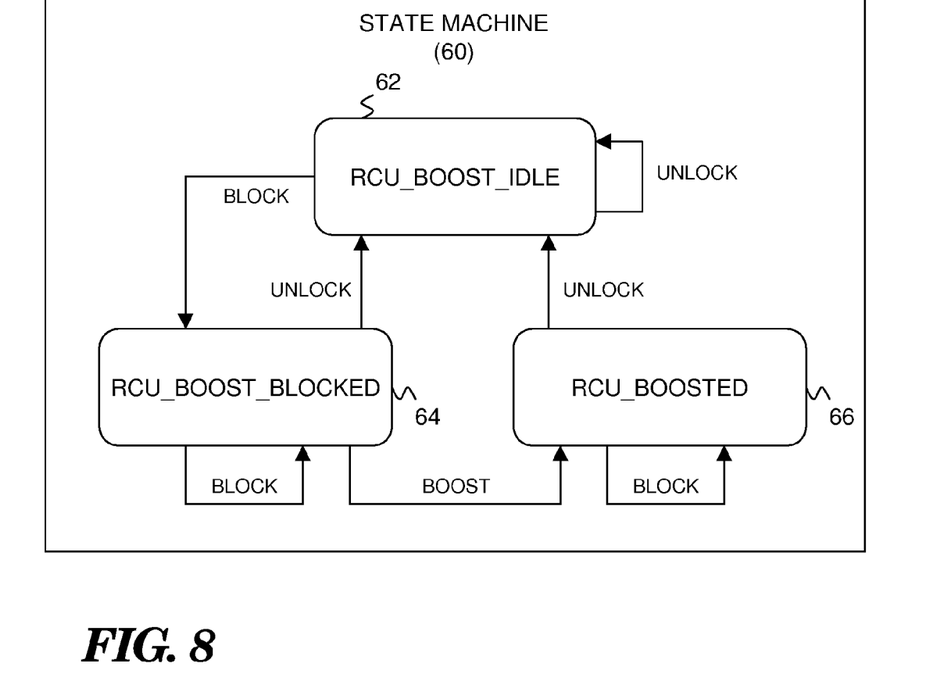
FIG. 8 is an exemplary state machine that may be used to implement race-free priority boosting in accordance with FIG. 7.

Turning now to FIG. 8, an exemplary implementation of the processing of FIG. 7 may utilize a state machine 60 in which readers $21_1, 21_2 \ldots 21_n$ are in one of three states during RCU read-side critical section processing. These reader states may be signified by a state variable stored as part of each reader's task structure. An "rcu_boost_idle" state 62 is the nominal idle state a reader $21_1, 21_2 \ldots 21_n$ will be in when it has not yet been removed from a processor $4_1, 4_2 \ldots 4_n$ and placed in a blocked state (e.g., to await a resource), and has not been preempted by another task, while within its current RCU read-side critical section. This may be referred to as an unlocked state as indicated by the arrow labeled "unlock" that begins and ends at the box representing the rcu_boost_idle state 62. If the reader thereafter blocks or is preempted, and if it is determined by the scheduler 40 in block 50 of FIG. 7 that the reader $21_1, 21_2 \ldots 21_n$ is in an RCU read-side critical section, the scheduler will place the reader in the ready-to-boost state 64 labeled "rcu_boost_blocked" in FIG. 8. This state serves to designate the reader $21_1, 21_2 \ldots 21_n$ as a candidate for priority boosting according to block 52 of FIG. 7. The transition from the rcu_boost_idle state 62 to the rcu_boost_blocked state 64 is identified by the arrow labeled "block" that extends between the boxes representing these two states. If the reader $21_1, 21_2 \ldots 21_n$ exits its RCU read-side critical section while in the rcu_boost_blocked state 64, it will be returned to the rcu_boost_idle state 62 by the RCU reader deregistration component 38. This transition is identified by arrow labeled "unlock" that extends between the boxes representing these two states. A check for a return to the rcu_boost_idle state 62 from the rcu_boost_blocked state 64 may be used to perform the verification operation of block 54 of FIG. 7 so that the reader's priority will not be boosted unnecessarily. The reader $21_1, 21_2 \ldots 21_n$ enters the boosted state 66 labeled "rcu_boosted" if its priority is boosted by the priority booster 42 in accordance with block 56 of FIG. 7 while in the rcu_boost_blocked state 64. This transition is identified by arrow labeled "boost" that extends between the boxes representing these two states. If the reader $21_1, 21_2 \ldots 21_n$ exits its RCU read-side critical section while in the rcu_boosted state 66, its priority will be decreased by the RCU reader deregistration component 38 according to box 58 of FIG. 7 and the reader will be returned to the rcu_boost_idle state 62. This transition is identified by the arrow labeled "Unlock" that extends between the boxes representing these two states. In both the rcu_boost_blocked state 64 and the rcu_boosted state 66, the reader $21_1, 21_2 \ldots 21_n$ may enter an RCU read-side critical section recursively. This will not change the reader's state, as shown by the arrows labeled "block" that begin and end at the boxes that respectively represent the rcu_boost_blocked state 64 and the rcu_boosted state 66.

Figure 9:
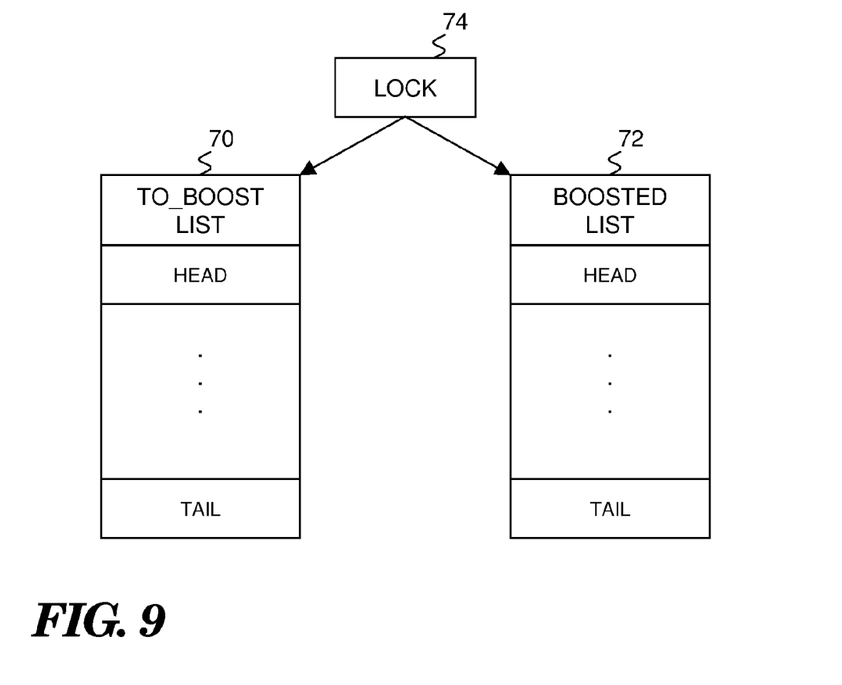
FIG. 9 is a diagrammatic representation of a pair of lists that may be used to implement race-free priority boosting in accordance with FIG. 7.

As shown in FIG. 9, a preempted or blocked reader $21_1, 21_2 \ldots 21_n$ may be added to one of two lists (or removed therefrom) according to its current state. A first list 70 (labeled "to_boost") is for readers in the rcu_boost_blocked state 62. A second list 72 (labeled "boosted") is for readers in the rcu_boosted state 64. When a reader $21_1, 21_2 \ldots 21_n$ is designated by the scheduler 40 as a candidate for priority boosting according to block 52 of FIG. 7, the scheduler may add a reference to the reader onto the tail of the first list 70. When the priority booster 42 needs to verify that the reader $21_1, 21_2 \ldots 21_n$ has not exited its critical section or terminated according to block 54 of FIG. 7, it can check for the presence of the reader reference on the first list 70. Only if the reader reference is on the first list 70 (or if it is on the second list 72 and subject to a second round of boosting) would the priority booster 42 perform the priority boosting operation of box 56 of FIG. 7. Otherwise, the priority booster 42 may safely assume that the RCU reader deregistration component 38 has removed the reader $21_1, 21_2 \ldots 21_n$ from the first list 70 (or the second list 72) as a result of the reader having exited its critical section. When the priority booster 42 implements the priority boosting operation according to box 56 of FIG. 7, it can move the reader from the first list 70 to the second list 72 representing readers whose priority has been boosted. As part of the priority decreasing operation performed according to box 58 of FIG. 7, the RCU reader deregistration component 38 can decrease the reader's priority if the reader is referenced on the second list 72, and then remove the reader from this list. If the reader is referenced on the first list 70, the RCU reader deregistration component 38 will simply remove the reader from this list without making any priority adjustment.

Figure 10:
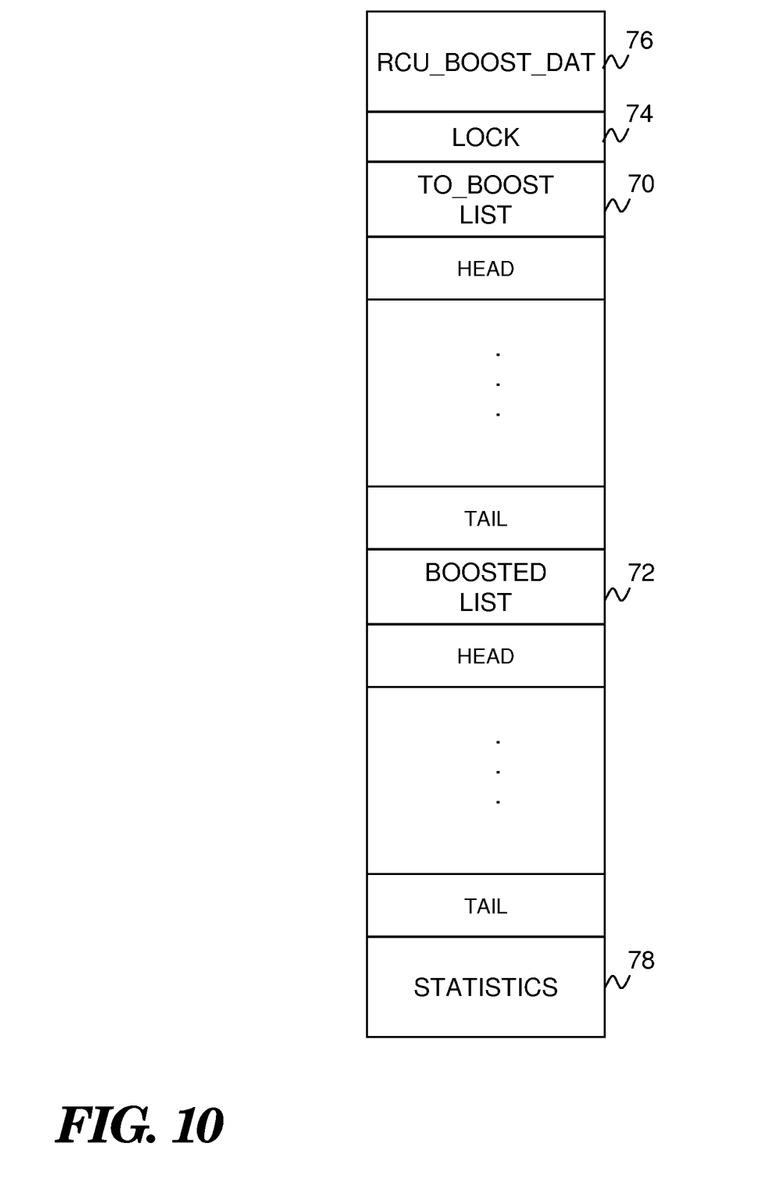
FIG. 10 is a diagrammatic representation of a data structure containing the list pair of FIG. 9.

As additionally shown in FIG. 9, the first list 70 and the second list 72 may be protected by a lock 74 or other mutual exclusion mechanism that serializes access to the lists during the priority boost designation, priority boosting, and priority decreasing operations 52, 56 and 58 of FIG. 7. In particular, the lock 74 guarantees that contention for access to the lists 70 and 72 by the scheduler 40 (during list supplementation), the priority booster 42 (during list transfer) and the RCU reader deregistration component 38 (during list removal) will be coordinated. As shown in FIG. 10, the first list 70 and the second list 72 may represent a list pair contained within a data structure 76 (labeled "rcu_boost_dat") that also includes the lock 74 together with optional statistics 78. The latter may include such information as the number of RCU read-side critical sections that have been blocked, the number of readers that the priority booster 42 has attempted to boost, the number of boost attempts that were successful, the number of readers $21_1, 21_2 \ldots 21_n$ whose priority needs to be decreased, etc.

Figure 11:
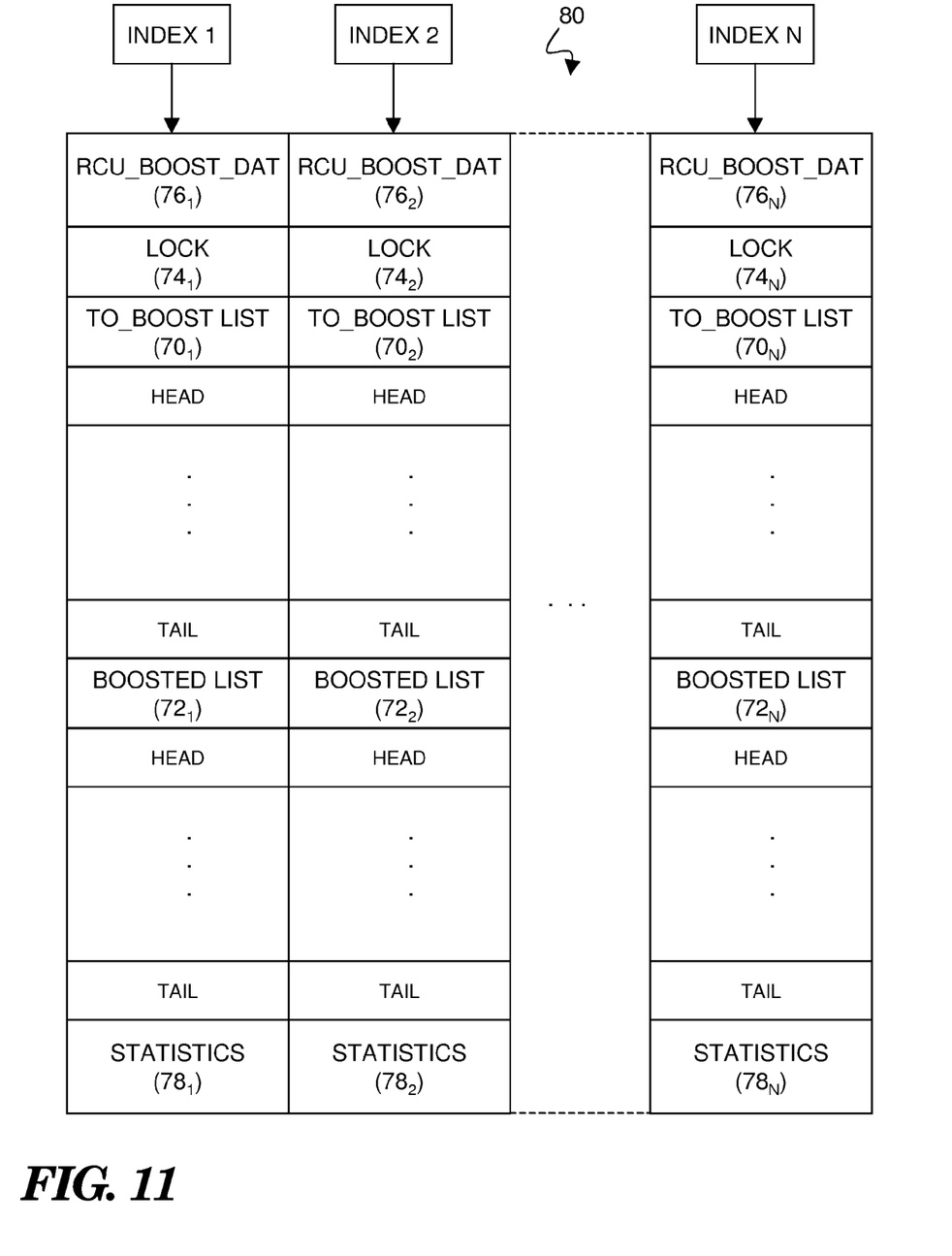
FIG. 11 is a diagrammatic representation of an array of the data structures of FIG. 10.

As further shown in FIG. 11, the data structure 76 may be constituted as an element of an array 80 of similar data structures each having a list pair 70/72 comprising a first list 70 portion and a second list 72 portion. The index values of the array 80 determine which of the list pairs 70/72 will be used by the scheduler 40 and the priority booster 42 to perform their list operations. The RCU reader deregistration component 38 will of course access any list pair 70/72 of the array 80 on which the current reader $21_1, 21_2 \ldots 21_n$ that invoked the RCU reader deregistration component is listed. The array index is periodically incremented in cyclical (modulo N) fashion so that different list pairs 70/72 will be used at different times for adding and removing readers on the lists 70 and 72. Preferably, the index used by the scheduler 40 to add new readers $21_1, 21_2 \ldots 21_n$ to the list 70 will be different from the index used by the priority booster 42 to transfer readers from the list 70 to the list 72. For example, for an array 80 of size N, if an index value of 0 is being used by the scheduler 40 to add new readers $21_1, 21_2 \ldots 21_n$ to the list 70 that have just entered the rcu_boost_blocked state 64, an index value of 0+N mod N may be used by the priority booster 42 to move readers that have just entered the rcu_boosted state 66 from the list 70 to the list 72. The priority booster 42 can be made responsible for incrementing the index value. Thus, when the scheduler 40 designates a reader $21_1, 21_2 \ldots 21_n$ as a candidate for priority boosting according to block 52 of FIG. 7, it may acquire a first list pair index to a list pair 70/72 of the array 80 that has been designated by the priority booster 42 to be used for adding readers. When the priority booster 42 performs the verification and priority boosting operations of blocks 54 and 56 of FIG. 7, it will acquire a second list pair index to a second list pair 70/72 of the array 80 that has been least recently used by the scheduler 40 to add new readers $21_1, 21_2 \ldots 21_n$.

Use of the array 80 and the above-described indexing scheme provides several advantages. First, contention for the lock 74 is reduced by having the scheduler 40 and the priority booster 42 use different list pairs 70/72 at any given time. Second, as described in more detail below, the priority booster 42 manipulates the lists 70/72 and scans them for unboosted readers $21_1, 21_2 \ldots 21_n$. These operations can be simplified if the lists 70/72 are kept relatively short. Third, unboosted readers $21_1, 21_2 \ldots 21_n$ are allowed to age on one of the lists 70 for the time required by the priority booster 42 to cycle through the array 80. This increases the likelihood that the readers will complete their RCU read-side critical sections without a priority boost, and consequently decreases the number of needless priority boosts. It will be appreciated that the array 80 may have any number of elements and that the actual number selected may depend in part on one or more of the foregoing factors.

Figure 12A:
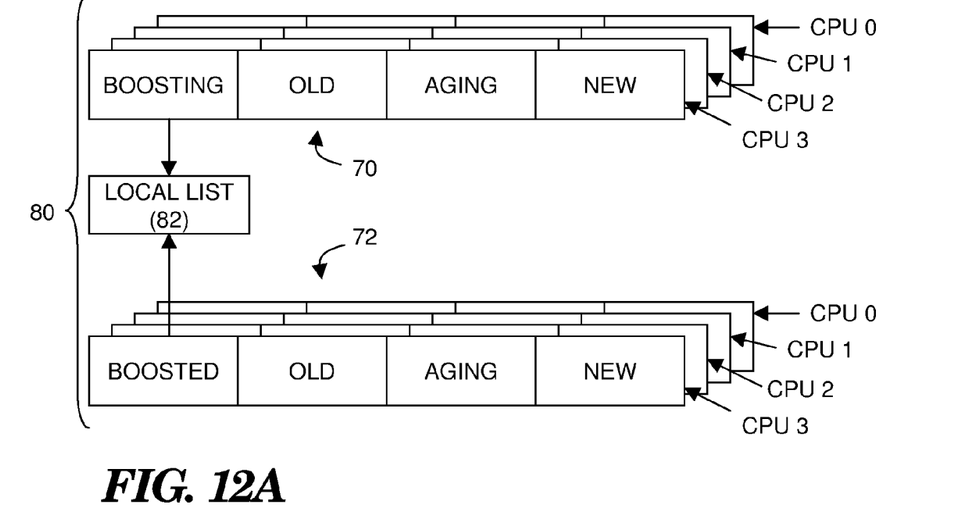
FIG. 12A is a diagrammatic representation of multiple per-CPU instances of the array of FIG. 11 showing the list pair portion of the array being accessed at a first index location.
Figure 12B:
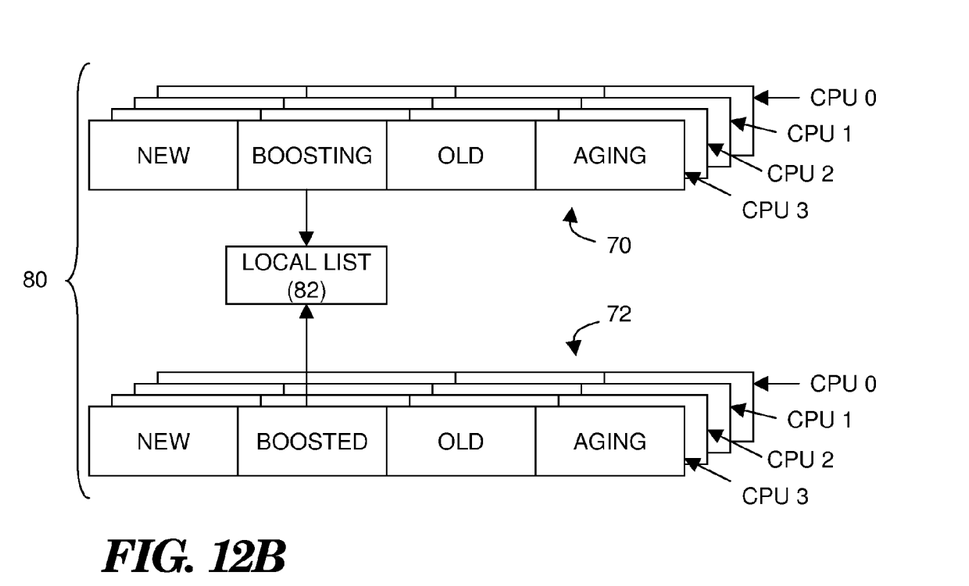
FIG. 12B is a diagrammatic representation of multiple per-CPU instances of the array of FIG. 11 showing the list pair portion of the array being accessed at a second index location.

Turning now to FIGS. 12A and 12B, the concept of the array 80 is further illustrated and an exemplary technique by which the priority booster 42 performs its list operations may now be described. FIGS. 12A and 12B each show the array 80 in a bifurcated state in order to depict the lists 70 separately from the lists 72. FIGS. 12A and 12B also assign different labels to the lists 70 and 72 according to their index value.

The lists 70 and 72 that are currently being processed by the priority booster 42 are respectively designated "boosting" and "boosted." The "boosted" label for the list 70 signifies that the readers $21_1, 21_2 \ldots 21_n$ referenced thereon are in the process of having their priority boosted and are being transferred to the list 72. The "boosted" label for the list 72 signifies that the newly boosted readers $21_1, 21_2 \ldots 21_n$ from the list 70 are being added to the list 72. The next three index positions for the lists 70 and 72 in the array 80 are respectively labeled "old," "aging" and "new" to reflect the length of time that has elapsed since the scheduler 40 last used that index. The new index is the index value that the scheduler is currently using to add new readers $21_1, 21_2 \ldots 21_n$ that are boost candidates to the list 70. FIG. 12B differs from FIG. 12A in that the index values have been incremented by one on each of the lists 70 and 70. FIGS. 12A and 12B further illustrate that there can be one array 80 for each processor in a multi-processor system environment, such as the system 2 of FIG. 4.

FIGS. 12A and 12 additionally show a box 82 that bears the label "local list" and which represents a concatenation of the lists 70 and 72 into a single local list. The concatenated list 82 is created by the priority booster 42 by acquiring the lock 74 for the currently indexed list pair 70/72 and splicing the lists together. The concatenated list 82 is then scanned and all readers $21_1, 21_2 \ldots 21_n$ (including previously boosted readers that have aged on the current list 72 for one cycle through the array 80) will have their priority boosted such that they will all assume the rcu_boosted state 66. These priority-boosted readers $21_1, 21_2 \ldots 21_n$ will then be placed on the list 72, and the list 70 will be empty. If desired, the lock 74 may be temporarily dropped following the list concatenation in to allow the priority booster 42 to sleep, thus avoiding imposing excessive scheduling latencies on realtime tasks. In that case, a check may be performed by the priority booster 42 when it wakes up to make sure that the concatenated list 82 is not empty as a result of all readers $21_1, 21_2 \ldots 21_n$ having been removed therefrom by the RCU reader deregistration component 38 while the priority booster 42 was sleeping.

The priority level to which the readers $21_1, 21_2 \ldots 21_n$ are boosted is a matter of design choice. One option is to boost reader priority to a level that is slightly less than the priority of the priority booster 42 if this can be done, otherwise to a realtime priority that is slightly higher than the priority booster's priority. By way of explanation, if the priority booster 42 has a realtime priority, it is desirable to boost the readers $21_1, 21_2 \ldots 21_n$ to a priority that is just below that of the priority booster insofar as this prevents the readers from interfering with the priority booster. However, if the priority booster 42 is running at a low non-realtime priority, boosting the readers $21_1, 21_2 \ldots 21_n$ to just below this non-realtime priority will be ineffective because normal priority aging would eventually achieve the same effect. Therefore, the reader priority may be boosted to the lowest realtime priority for this case.

Processing options that may be implemented by the priority booster 42 include boosting the reader priority more aggressively under low memory conditions, boosting reader priority to successively higher levels (as described above), re-boosting already boosted tasks to account for changes in the priority booster's priority, and implementing priority boosting in multiple per-processor or per-multiprocessor node instances in a multi-processor or multi-mode environment.

Figure 13:
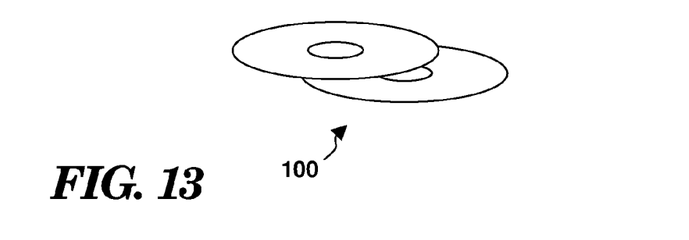
FIG. 13 is a diagrammatic illustration of media that can be used to provide a computer program product for implementing efficient priority boosting in accordance with the invention.

Accordingly, a technique has been disclosed for efficiently boosting the priority of a preempted reader while resolving races between the priority boosting and the reader exiting a critical section or terminating, thereby removing impediments to grace period processing in which the destruction of a shared data element is deferred until pre-existing references to the data element are removed. It will be appreciated that the foregoing concepts may be variously embodied in any of a data processing system, a machine implemented method, and a computer program product in which programming logic is provided by one or more machine-useable media for use in controlling a data processing system to perform the required functions. Relative to a computer program product having a machine-readable media and programming logic for controlling a data processing system, exemplary machine-readable media for providing such programming logic are shown by reference numeral 100 in FIG. 13. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the appended claims and their equivalents.

What is claimed is:

1. A method for efficiently boosting the priority of a preemptable data reader while resolving races between said priority boosting and said reader exiting a critical section or terminating in order to eliminate impediments to grace period processing that defers the destruction of one or more shared data elements that may be referenced by said reader until said reader is no longer capable of referencing said one or more data elements, comprising:
    a scheduler determining that said reader is in a read-side critical section;
    said scheduler designating said reader as a candidate for priority boosting;
    a priority booster determining again by performing a verifying operation that said reader has not exited its critical section or terminated;
    said priority booster boosting said reader's priority by performing a boosting operation to expedite said reader's completion of said critical section; and
    a reader deregistration component decreasing said reader's priority following said reader's completion of said critical section.

2. A method in accordance with claim 1 wherein said designating operation comprises changing a state of said reader from a first state that is indicative of said reader's priority not requiring boosting to a second state that is indicative of said reader's priority requiring boosting, and wherein said priority boosting operation includes changing said state of said reader from said second state to a third state that is indicative of said reader's priority having been boosted, and further wherein said priority decreasing operation includes changing said state of said reader from said third state to said first state.

3. A method in accordance with claim 1 wherein said designating operation comprises adding a reference to said reader on a first list of readers requiring priority boosting, and wherein said verifying operation comprises determining whether said reference to said reader is still on said first list of readers, and wherein said priority boosting operation comprises moving said reference to said reader from said first list to a second list of readers whose priority has been boosted, and further wherein said priority decreasing operation comprises removing said reference to said reader from whichever of said first list and said second list said reference is on.

4. A method in accordance with claim 3 wherein said first list and said second list are protected by a lock or other mutual exclusion mechanism to serialize access thereto during said priority boosting operation and said priority decreasing operation.

5. A method in accordance with claim 4 wherein said first list and said second list represent a list pair that is an element of an array of similar list pairs each comprising a first list portion and a second list portion.

6. A method in accordance with claim 5 wherein said designating operation comprises acquiring a first list pair index to a list pair of said array that is to be used for adding reader references, and wherein said priority boosting operation comprises acquiring a second list pair index to a second list pair of said array that has been least recently used by said designating operation to add reader references.

7. A method in accordance with claim 1 further including one or more of said priority boosting operation boosting said reader's priority more aggressively under low memory conditions, said priority boosting operation successively boosting said reader's priority, said priority boosting operation re-boosting an already boosted reader to account for changes in the priority of said priority boosting operation, and said priority boosting operation being implemented in multiple per-processor or per-multiprocessor node instances in the event that said method is implemented in a multi-processor or multi-mode environment.

8. A data processing system having one or more processors, a memory and a communication pathway between the one or more processors and the memory, said system being adapted to efficiently boost the priority of a preemptable data reader while resolving races between said priority boosting and said reader exiting a critical section or terminating in order to eliminate impediments to grace period processing that defers the destruction of one or more shared data elements that may be referenced by said reader until said reader is no longer capable of referencing said one or more data elements, said system further comprising:
    a real-time preemptive scheduler adapted to preemptively schedule said reader for execution;
    critical section entry determining logic in said scheduler adapted to determine that a reader is in a read-side critical section;
    designating logic in said scheduler adapted to designate said reader as a candidate for priority boosting;
    a priority booster;
    critical section non-exit verification logic in said priority booster adapted to determine again that said reader has not exited its critical section;
    priority boosting logic in said priority booster responsive to said determining logic and adapted to boost said reader's priority by performing a boosting operation to expedite said reader's completion of said critical section;
    a reader deregistration component; and
    priority decreasing logic in said reader deregistration component adapted to decrease said reader's priority following said reader's completion of said critical section.

9. A system in accordance with claim 8 wherein said designating logic is adapted to change a state of said reader from a first state that is indicative of said reader's priority not requiring boosting to a second state that is indicative of said reader's priority requiring boosting, and wherein said priority boosting logic is adapted to change said state of said reader from said second state to a third state that is indicative of said reader's priority having been boosted, and further wherein said priority decreasing logic is adapted to change said state of said reader from said third state to said first state.

10. A system in accordance with claim 8 further comprising a first list of readers requiring priority boosting and a second list of readers whose priority has been boosted, and wherein said designating logic is adapted to add a reference to said reader on said first list, and wherein said critical section non-exit verification logic is adapted to determine whether said reference to said reader is still on said first list, and wherein said priority boosting logic is adapted to move said reference to said reader from said first list to said second list, and further wherein said priority decreasing logic is adapted to remove said reference to said reader from whichever of said first list and said second list said reference is on.

11. A system in accordance with claim 10 wherein said first list and said second list are protected by a lock or other mutual exclusion mechanism to serialize access thereto during said priority boosting operation and said priority decreasing operation.

12. A system in accordance with claim 11 wherein said first list and said second list represent a list pair that is an element of an array of similar list pairs each comprising a first list portion and a second list portion.

13. A system in accordance with claim 12 wherein said designating logic is adapted to acquire a first list pair index to a list pair of said array that is to be used for adding reader references, and wherein said boosting logic is adapted to acquire a second list pair index to a second list pair of said array that has been least recently used by said designating logic to add reader references.

14. A computer program product, comprising:
one or more non-transitory machine-readable storage media;
programming logic provided by said one or more media for programming a data processing platform to efficiently boost the priority of a preemptable data reader while resolving races between said priority boosting and said reader exiting a critical section or terminating in order to eliminate impediments to grace period processing that defers the destruction of one or more shared data elements that may be referenced by said reader until said reader is no longer capable of referencing said one or more data elements, as by:
a scheduler determining that said reader has entered a read-side critical section;
said scheduler designating said reader as a candidate for priority boosting;
a priority booster determining again by performing a verification operation that said reader has not exited its critical section or terminated;
said priority booster boosting said reader's priority by performing a boosting operation to expedite said reader's completion of said critical section; and
a reader deregistration component decreasing said reader's priority following said reader's completion of said critical section.

15. A computer program product in accordance with claim 14 wherein said designating operation comprises changing a state of said reader from a first state that is indicative of said reader's priority not requiring boosting to a second state that is indicative of said reader's priority requiring boosting, and wherein said priority boosting operation includes changing said state of said reader from said second state to a third state that is indicative of said reader's priority having been boosted, and further wherein said priority decreasing operation includes changing said state of said reader from said third state to said first state.

16. A computer program product in accordance with claim 14 wherein said designating operation comprises adding a reference to said reader on a first list of readers requiring priority boosting, and wherein said verifying operation comprises determining whether said reference to said reader is still on said first list of readers, and wherein said priority boosting operation comprises moving said reference to said reader from said first list to a second list of readers whose priority has been boosted, and further wherein said priority decreasing operation comprises removing said reference to said reader from whichever of said first list and said second list said reference is on.

17. A computer program product in accordance with claim 16 wherein said first list and said second list are protected by a lock or other mutual exclusion mechanism to serialize access thereto during said priority boosting operation and said priority decreasing operation.

18. A computer program product in accordance with claim 17 wherein said first list and said second list represent a list pair that is an element of an array of similar list pairs each comprising a first list portion and a second list portion.

19. A computer program product in accordance with claim 18 wherein said designating operation comprises acquiring a first list pair index to a list pair of said array that is to be used for adding reader references, and wherein said priority boosting operation comprises acquiring a second list pair index to a second list pair of said array that has been least recently used by said designating operation to add reader references.

20. A computer program product in accordance with claim 14 further including one or more of said priority boosting operation boosting said reader's priority more aggressively under low memory conditions, said priority boosting operation successively boosting said reader's priority, said priority boosting operation re-boosting an already boosted reader to account for changes in the priority of said priority boosting operation, and said priority boosting operation being implemented in multiple per-processor or per-multiprocessor node instances in the event that said method is implemented in a multi-processor or multi-mode environment.

\* \* \* \* \*